Jan. 31, 1939. M. H. HANSEN 2,145,480
WEIGHING SCALE
Filed Sept. 19, 1936 3 Sheets-Sheet 1
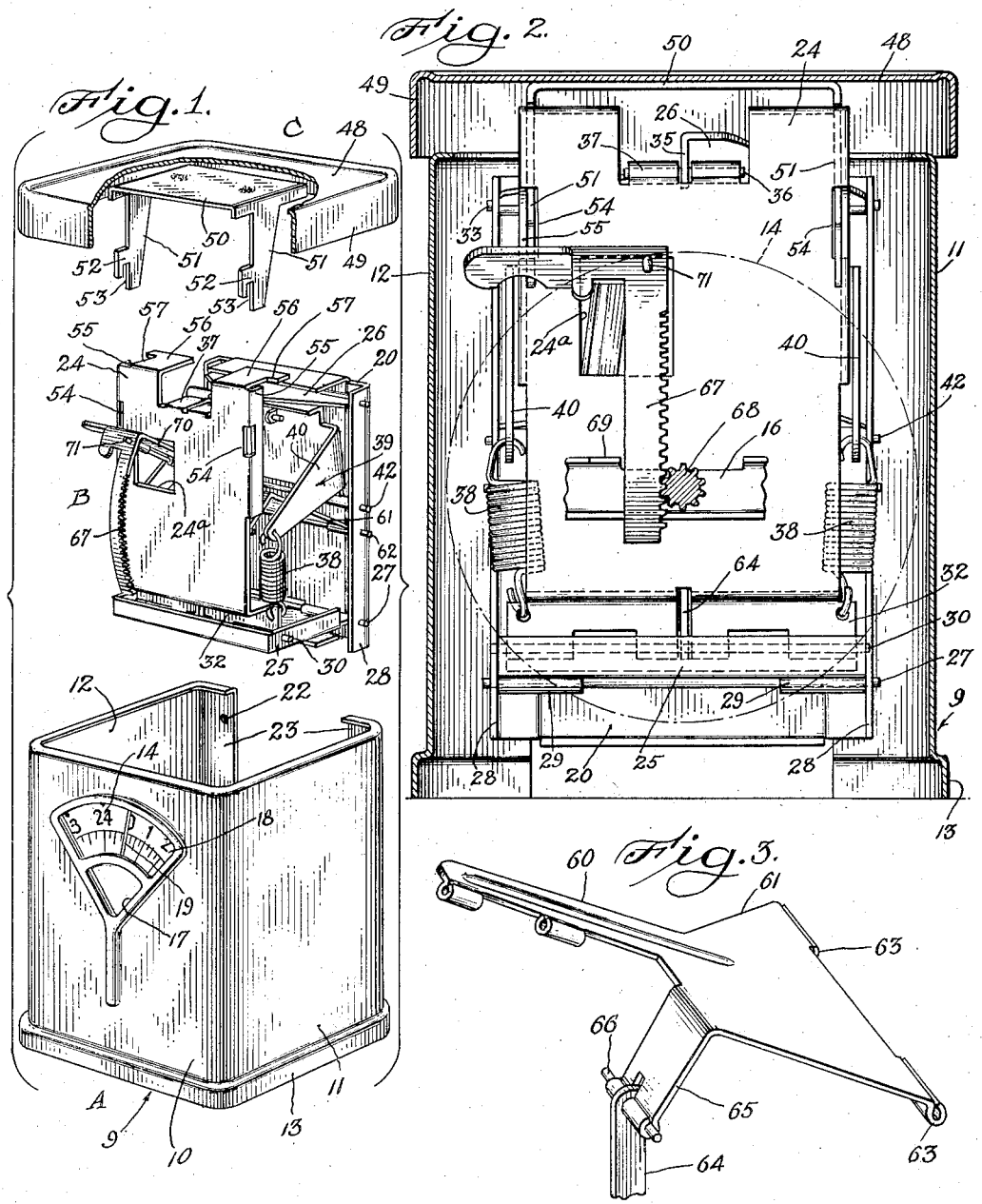
Inventor
Marius H. Hansen
BY
Parker, Carlson, Pitzner & Hubbard
Attorneys.

Jan. 31, 1939.   M. H. HANSEN   2,145,480
WEIGHING SCALE
Filed Sept. 19, 1936    3 Sheets-Sheet 2
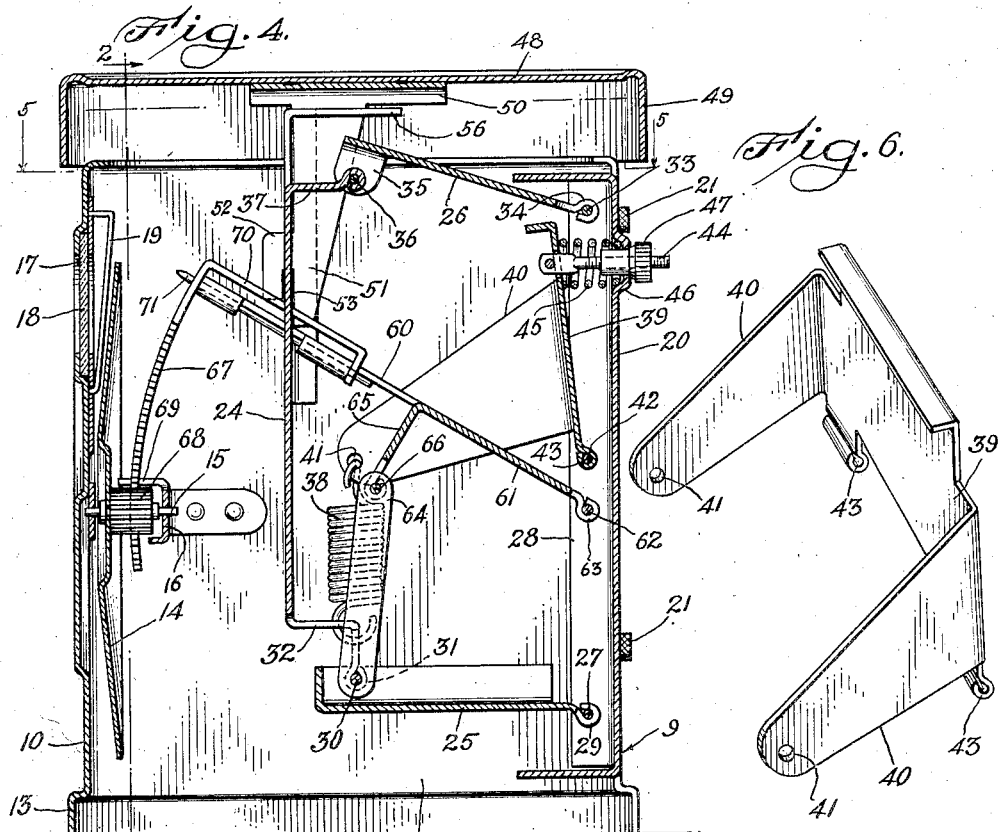
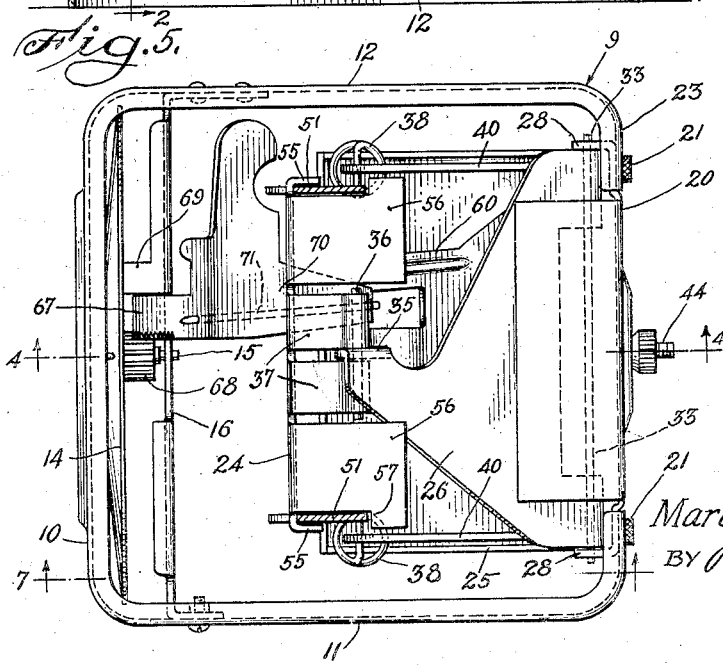
Inventor
Marius H. Hansen
BY Parker, Carton,
P'Byrne & Hubbard.
Attorneys.

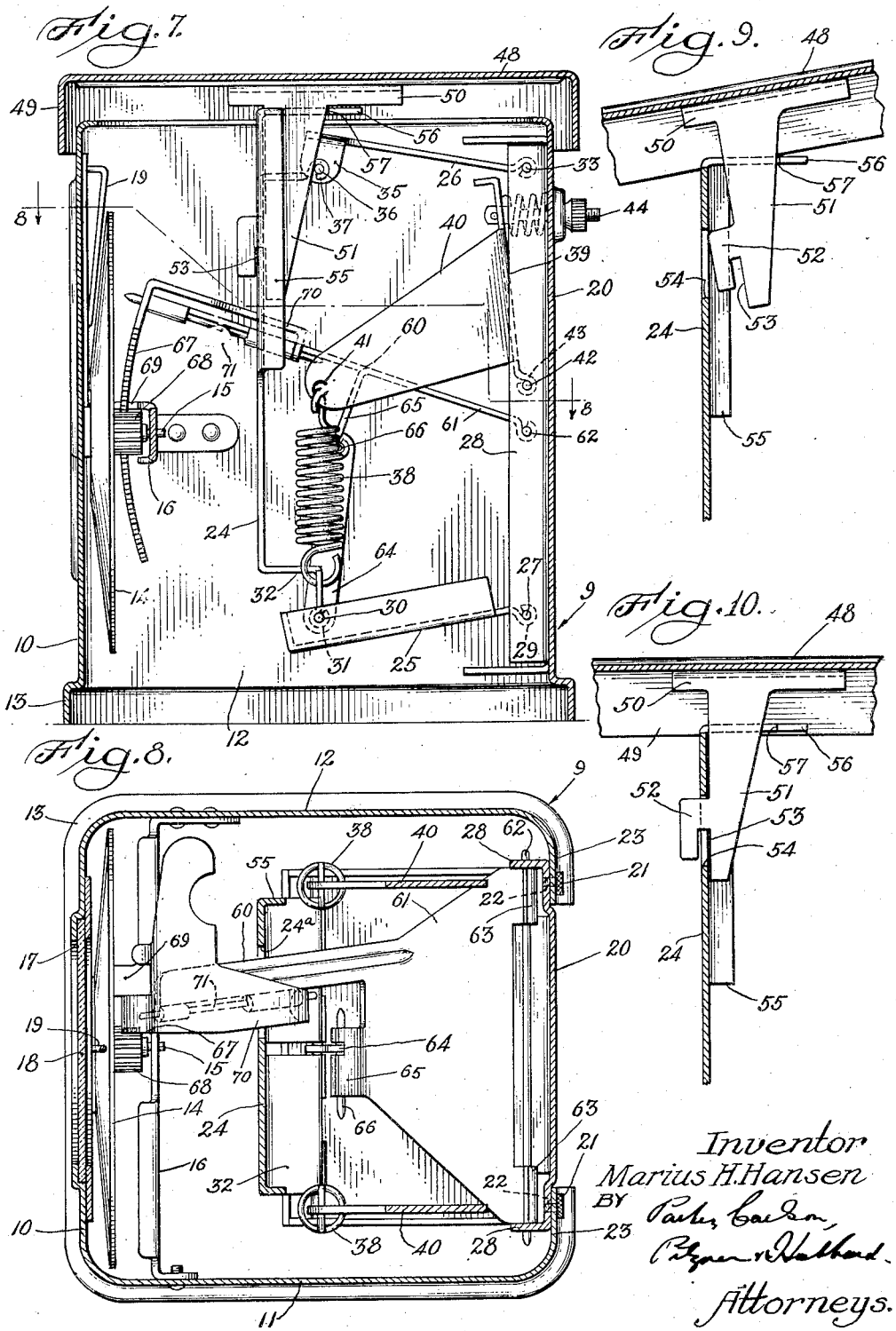

Patented Jan. 31, 1939

2,145,480

UNITED STATES PATENT OFFICE 2,145,480

WEIGHING SCALE

Marius H. Hansen, Chicago, Ill., assignor to Hanson Scale Company, Chicago, Ill., a corporation of Illinois Application September 19, 1936, Serial No. 101,592

11 Claims. (Cl. 265—68)

This invention relates to spring scales, and particularly to the type commonly termed "household" or "kitchen" scales.

Then general object of the invention is to provide a scale of inexpensive construction which shall, however, be accurate in operation even though the article being weighed may not be positioned centrally upon the platform. Low cost of manufacture is preferably obtained by constructing the scale in units, each of which may be readily manufactured and assembled and the units quickly united and the necessary adjustments effected to obtain accuracy in operation.

Further objects and advantages of the invention will become apparent as the following description proceeds and the features of novelty which characterize the invention are pointed out with particularity in the claims annexed to and forming a part of this specification.

For a better understanding of the invention, reference may be had to the accompanying drawings in which—

Figure 1 is an exploded perspective view of a scale, embodying the invention, and particularly illustrating the three principal units thereof.

Fig. 2 is a vertical sectional view of the scale taken in plane of the line 2—2 in Fig. 4.

Fig. 3 is a perspective view of the indicator mechanism actuating arm.

Fig. 4 is a vertical sectional view taken in plane of the line 4—4 in Fig. 5.

Fig. 5 is a horizontal sectional view, the platform being omitted and the supports for the platform being sectioned on the plane of line 5—5 of Fig. 4.

Fig. 6 is a perspective view of one of the levers of the scale mechanism.

Fig. 7 is a vertical sectional view on the line 7—7 in Fig. 5.

Fig. 8 is a generally horizontal section on the line 8—8 of Fig. 7.

Figs. 9 and 10 are fragmentary sectional views showing the mode of connecting and disconnecting the platform from the scale mechanism.

The invention has, for purposes of illustration, been shown as embodied in a scale, particularly adapted for household use. Referring first to Fig. 1, it will be seen that the scale comprises a unit A constituting the major portion of the casing or base, a unit B comprising all of the scale mechanism except the rotatable indicating dial and its attached pinion which are mounted on the casing, and a unit C embodying the platform and its attached supports.

The casing or base unit A is of a generally box-like structure and preferably includes a portion of sheet metal having a horizontal U-shaped cross section, thus forming a casing 9 including a front wall 10, as well as side walls 11 and 12. The lower edge portions 13 of the front and side walls are flared outwardly in order to form a more stable support and improve the appearance of the casing. The scale mechanism unit B is insertable into the casing 9 through the open top wall thereof and is detachably secured in position as hereinafter described.

Cooperating relatively movable indicating members are preferably mounted on the casing 9 in such manner that they are operatively engaged by a suitable actuating mechanism included in unit B when the latter is positioned in the casing. In the construction illustrated, the indicating members include a rotatable dial 14 having a suitably numbered scale on the front face thereof and supported by a shaft 15 journaled in the front wall 10 of the casing and in the mid-portion of the horizontally extending bracket 16. The opposite ends of the bracket 16 are secured to the casing side walls 11 and 12 (Fig. 5). A segment of the scale on the dial 14 is exposed to view through a sector-shaped aperture 17 formed in the front casing wall 10. A piece of glass 18 (Figs. 4 and 8) is preferably secured in the aperture 17. A stationary pointer or indicator member 19 cooperates with the dial 14 to indicate the load placed on the platform of the scale.

The weighing mechanism unit B is provided with a framework including a substantially rectangular vertically disposed plate 20. This plate is detachably secured in position within the casing 9 by suitable screws 21 threaded in tapped holes formed along edges of the plate 20 and passing through registering holes 22 formed in inwardly extending flanges 23 on the rear edges of the casing 9. The plate 20 thus forms a rear wall for the casing so that the weighing mechanism is entirely enclosed. The weighing mechanism itself includes in general an arrangement for yieldingly resisting downward movement of the platform unit C when the latter is loaded so that the displacement of the platform is proportional to the load thereon and this displacement movement is transmitted through a suitable actuating mechanism to the rotatable dial 14.

The preferred weighing mechanism illustrated includes a vertically disposed link or plate 24 which is detachably but rigidly attached to the platform unit C as hereinafter described, thus in effect forming a depending projection thereon. This plate 24 is yieldably supported for generally vertical movement on the supporting plate 20. This supporting arrangement includes a lower pivoted link 25 and an upper pivoted link 26. The link 25 is shown in the form of a generally rectangular plate having upwardly extending peripheral flanges. The rear edge of the plate 25 is pivotally connected to the supporting plate 20 by a pin 27 journaled in suitable holes formed in vertically extending edge flanges 28 on the supporting plate 20. Ears 29 formed on the rear edge of the plate 25 engage the pin 27. The front edge portion of the link or plate 25 is pivotally connected to the lower end portion of the vertically disposed plate 24, by means of a pin 30. The ends of the pin 30 are journaled in side flanges formed on the plate 25 while ears 31 formed on the lower edge of the offset lower end portion 32 of the plate 24 surround the pin. The rear end of the link or plate 26 is similarly pivotally connected to the supporting plate 20 by a pin 33 having its ends journaled in flanges 28 and with its central portion connected to the plate 26 by ears 34, which are bent about the central portion of the pin. The link or plate 26 is generally triangular in shape (Fig. 5) and the front end thereof is provided with a depending lug 35 which is pivotally connected to the upper portion of the plate 24 by a pin 36. Upon reference to Fig. 4 it will be seen that the pin 36 is engaged by rearwardly extending ears 37 struck out from the plate 24.

The plates or links 24, 25 and 26 thus form a pivoted linkage mechanism by means which the plate 24 is guided for generally vertical endwise movement. This movement is yieldingly resisted by a pair of tension springs 38 having their lower ends connected to the opposite ends of portion 32 of the plate 24 (Fig. 2). The upper ends of the springs 38 are secured to a suitable adjustment mechanism by means of which the position of the link 24 may be varied to adjust the zero setting of the dial 14 as hereinafter described. This adjustable supporting mechanism preferably includes a bracket 39 formed from a U-shaped portion of sheet metal (Fig. 6) and having forwardly extending arms 40. As best shown in Fig. 4, the upper hooked ends of the tension springs 38 engage holes 41 formed in the outer end portions of the bracket arms 40. The bracket 39 is pivotally supported on the base plate 20 by a pivot pin 42 journaled in the flanges 28 and engaged by suitable ears 43 formed on the lower edge portion of the bracket. The pivotal position of the bracket 39 on its supporting pin 42 is adjusted by a bolt 44 connected to the upper edge portion of the bracket 39 and extending through an aperture in the plate 20. A compression spring 45 is interposed between the bracket 39 and the plate 20, one end of the spring being seated in a depression 46 formed in the supporting plate. A nut 47 threaded on the bolt 44 serves to adjust the position of the bracket 39. Thus, when the bracket arms 40 are moved upwardly, the springs 38 are also moved upwardly as is the attached linkage including the links 24, 25 and 26.

The platform unit C includes a horizontal platform 48 preferably formed from a generally rectangular portion of sheet metal. An integral depending flange 49 formed on the platform 48 extends entirely about the periphery thereof and overlies the adjacent side walls of the casing 9. The flange 49 is disposed in spaced relation to the side walls of the casing so that there will be no frictional contact therebetween in case of lateral displacement of the platform due to eccentric loading thereon, for example, while, at the same time, the scale is given a pleasing appearance. Also, the flange 49 aids in preventing the entrance of dirt or other foreign matter into the scale mechanism located within the casing.

The platform 48 is detachably secured to the vertically extending link or plate 24 at spaced points. In the preferred construction illustrated, a U-shaped bracket 50 is riveted or otherwise rigidly secured to the lower side of the platform 48. This bracket includes depending spaced arms 51 having offset lower end portions 52 with slots 53 formed therein. These lower end portions of the arms 51 are adapted to be inserted in spaced apertures 54 formed in the plate 24. Upon reference to Fig. 1, it will be seen that the apertures 54 are formed at the edges between the front faces of the plate 24 and rearwardly extending side flanges 55 formed thereon. As shown in Fig. 9, the platform 48 is attached to the plate 24 by tilting the same at an angle and inserting the offset lower end portions 52 of the arms 51 into the apertures 54 until they are arranged in the position shown in Fig. 10. The platform 48 is then moved downwardly so that the adjacent edge portions of the plate 24 are inserted into the slots 53. The flanges 55 on the plate 24 bear against the sides of the arms 51, thereby preventing side tilting of the platform on its supporting plate. The engagement of the slots 53 with the plate 24 similarly prevents endwise tilting of the platform. It will be noted that the central portions of the arms 51 bear against the adjacent rear face of the plate 24 (Fig. 4) and that the extended lower end portions of the arms 51 also bear against the rear face of the plate 24. Further stability in the connection is had by providing rearwardly extending flanges 56 on the upper edge of the vertical plate 24. The side edges of these flanges or projections are provided with recesses 57 (Fig. 1) adapted to receive the bracket arms 51 on the platform 48 and the rear edges of the bracket arms engage the shoulder ends of the recesses 57. It will thus be seen that an exceptionally firm and rigid mounting for the platform is had even though it may be readily detached when required.

When an object to be weighed is placed on the platform 48 it will be displaced downwardly a distance proportional to the weight of the object, this movement being yieldingly resisted by the tension springs 38. The mechanism for transmitting this displacement movement to the rotary indicating dial 14 is preferably of such character, and cooperates with the supporting mechanism for the platform in such manner, that an indication proportional to the mean displacement of the platform will be had, irrespective of the eccentricity of the loading. In the preferred construction illustrated, this mechanism includes an actuating arm 60 (Fig. 3) having a triangular enlarged rear end portion 61 pivotally supported on the vertical supporting plate 20 by a pin 62. The ends of the pin 62 are journaled in flanges 28 (Fig. 8) and suitable ears 63 formed on the rear edge of the arm base portion 61 surround the pin. The arm 60 is connected to the supporting linkage for the platform by a link 64. The lower end of the link 64 is pivoted to the central portion of the plate or link 24 by the pin 30 which also serves to connect the plate 24 with the plate 25. The upper end of the link 64 is pivoted to a lug or extension 65 on the actuating arm 60 by a pin 66. The indicator mechanism actuating arm 60 is thus operatively connected to the plate 24 at a point intermediate the points of connection of the springs 38 to the platform extension formed by the plate 24 and is symmetrically disposed with respect to these spaced points. Consequently, if a load is placed eccentrically on the platform 48 so that it is tilted and one of the springs 38 stretched more than the other, the displacement of the actuating arm 60 due to the downward movement of the platform 48 and its attached plate or link 24 will be the mean displacement of the platform and thus the true weight of the load placed thereon will be indicated.

The actuating arm 60 extends through an aperture 24a in the plate 24 and is operatively connected to the dial 14 through an arcuate rack 67 meshing with a pinion 68, which is rigidly secured to the shaft 15 (Fig. 4). The rack 67 is guided for movement in a generally vertical plane by a lug 69 formed on the bracket 16 and bearing against the rear edge of the rack (Fig. 5). The rack 67 is connected to the actuating arm 60 in such a manner that any skewing or tilting of the arm 60 due to unavoidable looseness in the mechanism will not result in a similar displacement of the rack. This connection includes a rearwardly extending projection 70 formed on the rack 67, which is disposed in alinement with the arm 60, and pivotally connected thereto by a pin 71 passing through suitable ears formed on the extension 70 and arm 60. The rack 67 and extension 70 are preferably formed from a single portion of sheet metal.

From the foregoing it will be apparent that downward movement of the actuating arm 60, due to a downward displacement of the platform 48 when loaded, will move the rack 67 downwardly about the axis of pivoted pin 62. This movement of the rack 67 will rotate the meshing pinion 68 and its attached indicating dial 14 so as to register the weight of the object placed on the platform. The zero setting of the dial 14 with respect to the fixed pointer 19 may be adjusted when the platform 48 is unloaded by the nut 47 on bolt 44. Thus, the nut 47 may be tightened or loosened, swinging the bracket 39 upwardly or downwardly as the case may be so as to permit the plate 24, as well as actuating arm 60, to move to a position in which the zero reading on the dial 14 registers with the stationary pointer 19.

The particular construction illustrated is especially advantageous in the manufacture of scales of the type described in large quantities. Thus, the several units A, B and C may be constructed separately and quickly assembled. In assembling the various units, the scale mechanism unit B is first inserted within the casing unit A through the open top wall thereof and the plate 20 secured in position by screws 21. A platform unit C is then detachably secured in position as hereinbefore described by inserting the slotted lower end portions of the bracket arms 51 in the apertures 54 formed in the plate 24. The zero reading of the indicator dial 14 is then set at the factory by the adjusting nut 47. If, during subsequent use, the spring 38 becomes stretched the dial may be reset from time to time as it becomes necessary. The particular arrangement of the rack 67 and its cooperating pinion 68 aids in the assembly operation described in that the rack 67 may be moved downwardly into mesh with the pinion 68 during the insertion of the weighing mechanism unit B in the casing without disturbing the various parts of the mechanism. It should also be noted that the relation of the parts of the weighing mechanism to the platform and to the actuating arm for the indicator mechanism is such that a true indication of the weight of the object placed on the platform 48 will be had, irrespective of the eccentricity of the loading.

Although a particular embodiment of the invention has been illustrated, there is no intention to thereby limit the invention to this particular preferred construction, but on the other hand the appended claims are intended to cover all modifications within the spirit and scope of the invention.

I claim as my invention:

1. A weighing scale comprising, in combination, a supporting framework, a horizontal platform disposed above said framework, a vertically disposed sheet metal plate rigidly but detachably secured to the lower side of said platform, tension springs connected to the lower corners of said plate and to said framework for yieldingly resisting displacement of said platform when loaded, horizontally disposed links pivotally connected respectively to the upper and lower portions of said plate and to said framework to confine said plate to substantially rectilinear endwise movement upon displacement of said platform, a movable visual indicating member having an actuating arm pivotally connected to said framework and extending through an aperture in said plate, and a link pivotally connected to said arm and to said plate midway between said springs for moving said arm an amount commensurate with the mean displacement of said platform irrespective of the eccentricity of the loading thereof.

2. A weighing scale comprising, in combination, a supporting framework, a horizontal platform disposed above said framework, means for yieldingly resisting displacement of said platform to limit the same to an amount proportional to the load thereon, a rotatable indicating dial having a pinion attached thereto and cooperating with a fixed pointer, a rack meshing with said pinion and guided for movement in a defined plane, a pivotally mounted actuating arm operatively connected to said platform, a projecting arm on said rack disposed in alinement with said actuating arm, and means pivotally connecting said arms at a plurality of spaced points for relative movement therebetween about a longitudinally extending axis whereby skewing of said first named arm will not affect the plane of movement of said second arm.

3. A weighing scale adapted to be assembled from a plurality of component unitary structures, comprising, a box-like sheet metal base unit having an opening at the upper end thereof, a fixed indicator member and a cooperating rotatable indicator member mounted on said base, a pinion attached to said rotatable indicator member, a framework insertable into said base unit through said opening therein as a second unitary structure, a platform disposed above said base as a third unitary structure, yieldable means on said framework for supporting said platform, and an actuating mechanism for said rotatable indicator mechanism carried by said framework, said mechanism including a vertically disposed rack movable into meshing engagement with said pinion upon insertion of said framework unit into said base unit.

4. A weighing scale adapted to be assembled from a plurality of component unitary structures comprising, a U-shaped portion of sheet metal forming a base unit having front and side walls with openings in the top and rear of the base unit, a framework insertable into said base through one of said openings and including a rear plate adapted to extend across said opening in the rear wall of said base unit, a spring biased vertically movable link mounted on said rear plate and constituting therewith a second unitary structure, a platform extending across the top of said base and detachably connected to said second unitary structure and forming a third unitary structure, and a dial mechanism mounted on said base unit and including a movable member positioned for operative mechanical connection with said second unitary structure upon the insertion thereof.

5. A weighing scale adapted to be assembled from a plurality of component unitary structures comprising a box-like sheet metal base unit having an opening therein affording access to the interior of the base unit, a framework detachably secured in said base and insertable therein through said opening, a weighing mechanism mounted on said framework as a second unitary structure, a platform extending across the top of said base and detachably connected to said weighing mechanism forming a third unitary structure, and a dial mechanism mounted on said base unit and including a movable member positioned for operative mechanical connection with said second unitary structure upon the insertion thereof.

6. A weighing scale comprising, in combination, a supporting framework, a horizontal platform disposed above said framework, a pair of depending arms rigidly secured to said platform in spaced relation, a vertically disposed plate-like member having spaced apertures therein adapted to detachably receive the lower portions of said arms, and means for yieldably supporting said member on said framework.

7. A weighing scale comprising, in combination, a supporting framework, a horizontal platform, a U-shaped portion of sheet metal rigidly secured to the lower side of said platform and forming spaced arms depending therefrom, said arms having vertically disposed slots formed in the lower end portions thereof, a vertically disposed plate having spaced apertures therein adapted to receive said slotted ends of said arms with the adjacent edge portions of the plate disposed in the slots, and means for yieldingly supporting said plate on said framework.

8. A weighing scale comprising, in combination, a supporting framework, a horizontal platform, a U-shaped portion of sheet metal rigidly secured to the lower side of said platform and forming spaced arms depending therefrom, said arms having vertically disposed slots formed in the lower end portions thereof, a vertically disposed plate having flanges thereon along the top and side edges thereof, said plate having apertures formed in the side edges thereof adapted to receive the slotted ends of said arms with the adjacent edge portions of the plate disposed in said slots, said flange along said top edge of said plate having recesses therein adapted to receive the adjacent intermediate portions of said arms when the ends thereof are positioned in said apertures, said side and top flanges bearing against said arms to prevent tilting of said platform with respect to said plate, and means for yieldingly supporting said plate in said framework.

9. A weighing mechanism adapted to be inserted as a unit in an open side of a scale casing comprising, a sheet metal plate adapted to form a closure for the open side of the casing, a vertical sheet metal plate adapted to be secured at spaced points along its upper edge to a platform assembly, said vertical plate having an aperture therein, linkage means for yieldingly supporting said vertical plate on said first-named plate in spaced generally parallel relation thereto, an operating link extending through said aperture, and a rack on the outer end of said operating link positioned for engagement with a dial mechanism pinion upon the insertion of the unit in the casing.

10. A weighing mechanism adapted to be inserted as a unit in an open side of a scale casing comprising, a sheet metal plate adapted to form a closure for the open side of the casing and having inwardly extending flanges formed on the lateral edges thereof, a vertical sheet metal plate adapted to be secured at spaced points along its upper edge to a platform assembly, said vertical plate having an aperture therein, means including a plurality of links extending between the lateral edges of said plates and pivotally mounted on said flanges for supporting said vertical plate on said first-named plate in spaced generally parallel relation thereto, an operating link extending through said aperture, and a rack on the outer end of said operating link positioned for engagement with a dial mechanism pinion upon the insertion of the unit in the casing.

11. A weighing mechanism adapted to be inserted as a unit in an open side of a scale casing comprising, a sheet metal plate adapted to form a closure for the open side of the casing and having inwardly extending flanges formed on the lateral edges thereof, a vertical sheet metal plate adapted to be secured at spaced points along its upper edge to a platform assembly, and linkage means for yieldingly supporting said vertical plate on said first-named plate in generally parallel relation thereto, said linkage means including a generally horizontal sheet metal plate pivoted at its forward end to the lower corners of said vertical plate and at its rearward end on said flanges.

MARIUS H. HANSEN.